US011363352B2

(12) United States Patent
Catalano et al.

(10) Patent No.: US 11,363,352 B2
(45) Date of Patent: *Jun. 14, 2022

(54) VIDEO CONTENT RELATIONSHIP MAPPING

(71) Applicant: INTERNATIONAL BUSINESS MACHINES CORPORATION, Armonk, NY (US)

(72) Inventors: Pasquale A. Catalano, Wallkill, NY (US); Andrew G. Crimmins, Montrose, NY (US); Arkadiy Tsfasman, Wappingers Falls, NY (US); John Werner, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,904

(22) Filed: Sep. 29, 2017

(65) Prior Publication Data
US 2019/0104347 A1 Apr. 4, 2019

(51) Int. Cl.
*H04N 21/84* (2011.01)
*H04N 21/435* (2011.01)
(Continued)

(52) U.S. Cl.
CPC ......... *H04N 21/84* (2013.01); *H04N 21/435* (2013.01); *H04N 21/44008* (2013.01);
(Continued)

(58) Field of Classification Search
CPC ........ H04N 21/44008; G06F 17/30017; G06F 17/30545; G06F 17/3053; G06F 17/40554;
(Continued)

(56) References Cited

U.S. PATENT DOCUMENTS

| 5,999,688 A | 12/1999 | Iggulden et al. |
| 7,096,486 B1 | 8/2006 | Ukai |

(Continued)

FOREIGN PATENT DOCUMENTS

| WO | 0122406 A1 | 3/2001 |
| WO | 2005086471 A1 | 9/2005 |

(Continued)

OTHER PUBLICATIONS

IBM: List of IBM Patents or Patent Applications Treated as Related (Appendix P), Dec. 28, 2017, pp. 1-2.
(Continued)

*Primary Examiner* — Hung Q Dang
(74) *Attorney, Agent, or Firm* — David Spalding

(57) ABSTRACT

A method and system for digital video content mapping includes receiving and parsing digital video content. Content tokens are defined for tagging content in the digital video content. A cognitive analysis is used to identify content tokens and tag content tokens in the digital video content. A relationship map is created between related tagged content tokens between instances of digital video content using a cognitive analysis. The relationship map indicates the strength of a relationship between the tagged plurality of content tokens and thereby the plurality of instances of digital video content.

13 Claims, 9 Drawing Sheets

(51) Int. Cl.
*H04N 21/44* (2011.01)
*H04N 21/443* (2011.01)
*H04N 21/466* (2011.01)
*H04N 21/845* (2011.01)
*H04N 21/8547* (2011.01)

(52) U.S. Cl.
CPC ..... *H04N 21/4431* (2013.01); *H04N 21/4662* (2013.01); *H04N 21/8456* (2013.01); *H04N 21/8547* (2013.01)

(58) Field of Classification Search
CPC .......... G06F 17/30958; G06K 9/00765; G06Q 30/0261; G06N 20/00; H04L 65/604; H04L 67/306
USPC .............. 386/239–248, 291–299; 705/14.58; 707/770; 715/201, 723; 706/12
See application file for complete search history.

(56) References Cited

U.S. PATENT DOCUMENTS

| | | | |
|---|---|---|---|
| 7,197,758 B1 | 3/2007 | Blackketter et al. | |
| 7,269,330 B1 | 9/2007 | Iggulden | |
| 7,444,660 B2 | 10/2008 | Dudkiewicz | |
| 7,540,009 B1 | 5/2009 | Bryant et al. | |
| 7,738,778 B2 | 6/2010 | Agnihotri et al. | |
| 7,894,709 B2 | 2/2011 | Barbieri | |
| 7,895,625 B1 | 2/2011 | Bryan et al. | |
| 7,966,395 B1* | 6/2011 | Pope | G06F 16/9535 709/224 |
| 8,001,143 B1* | 8/2011 | Gupta | G06F 17/3082 345/614 |
| 8,230,343 B2* | 7/2012 | Logan | H04H 20/28 715/723 |
| 8,467,660 B2 | 6/2013 | Gilpin | |
| 8,645,832 B2 | 2/2014 | Pea et al. | |
| 8,804,999 B2 | 8/2014 | Ho et al. | |
| 9,008,489 B2 | 4/2015 | Nakazawa et al. | |
| 9,420,355 B2 | 8/2016 | Lock | |
| 9,513,778 B1 | 12/2016 | Zhang et al. | |
| 9,569,549 B1 | 2/2017 | Jenkins et al. | |
| 9,767,158 B1* | 9/2017 | Lewis | G06F 17/3053 |
| 2002/0069218 A1* | 6/2002 | Sull | G06F 17/30796 715/202 |
| 2002/0163532 A1* | 11/2002 | Thomas | G06F 17/30814 715/723 |
| 2007/0140651 A1 | 6/2007 | Hashimoto | |
| 2007/0220554 A1 | 9/2007 | Barton et al. | |
| 2008/0134039 A1 | 6/2008 | Fischer et al. | |
| 2008/0183719 A1* | 7/2008 | Kageyama | G06F 16/958 |
| 2009/0041356 A1* | 2/2009 | Barbieri | G06F 16/739 382/190 |
| 2009/0052863 A1 | 2/2009 | Parmar | |
| 2009/0133090 A1 | 5/2009 | Busse | |
| 2009/0193458 A1* | 7/2009 | Finseth | G06Q 30/0225 725/42 |
| 2010/0178025 A1 | 7/2010 | Bhogal | |
| 2010/0183279 A1 | 7/2010 | Pradeep et al. | |
| 2010/0199295 A1 | 8/2010 | Katpelly et al. | |
| 2011/0052156 A1 | 3/2011 | Kuhn | |
| 2011/0184807 A1 | 7/2011 | Wang | |
| 2011/0258188 A1 | 10/2011 | Abdalmageed | |
| 2012/0330950 A1 | 12/2012 | Pichumani | |
| 2013/0103624 A1* | 4/2013 | Thieberger | G06N 99/005 706/12 |
| 2014/0236725 A1* | 8/2014 | Golden | G06Q 30/0261 705/14.58 |
| 2014/0282772 A1 | 9/2014 | Chen et al. | |
| 2015/0007030 A1* | 1/2015 | Noy | G11B 27/031 715/719 |
| 2015/0009363 A1 | 1/2015 | Li et al. | |
| 2015/0264092 A1 | 9/2015 | Merger et al. | |
| 2016/0012066 A1 | 1/2016 | Ning et al. | |
| 2016/0042481 A1 | 2/2016 | Williams et al. | |
| 2016/0057482 A1 | 2/2016 | Anderson et al. | |
| 2016/0105385 A1* | 4/2016 | Allen | G06F 16/2255 709/206 |
| 2016/0227285 A1 | 8/2016 | Voss | |
| 2016/0253325 A1* | 9/2016 | Morley | G06Q 30/0631 707/749 |
| 2016/0307044 A1 | 10/2016 | Marilly et al. | |
| 2016/0330521 A1 | 11/2016 | Yang et al. | |
| 2016/0364397 A1* | 12/2016 | Lindner | G06F 16/24578 |
| 2017/0031690 A1 | 2/2017 | Ren | |
| 2017/0280099 A1 | 9/2017 | John | |
| 2018/0035151 A1 | 2/2018 | Jassin | |
| 2018/0225379 A1* | 8/2018 | Bhadury | G06F 7/026 |
| 2018/0285478 A1* | 10/2018 | Wright | G06F 16/9024 |

FOREIGN PATENT DOCUMENTS

| | | |
|---|---|---|
| WO | 2011162648 A1 | 12/2011 |
| WO | 2016190945 A1 | 12/2016 |

OTHER PUBLICATIONS

Pending U.S. Appl. No. 15/835,552, filed Dec. 8, 2017, entitled: "Video Content Relationship Mapping", pp. 1-52.

Pending U.S. Appl. No. 15/835,868, filed Dec. 8, 2017, entitled: "Cognitive Digital Video Recorder", pp. 1-46.

Pending U.S. Appl. No. 15/836,118, filed Dec. 8, 2017, entitled: "Cognitive Digital Video Filtering Based on User Preferences", pp. 1-33.

Carlson, "Tapping into TiVo: Digital video recorders and the transition from schedules to surveillance in television", New Media & Society, vol. 8, No. 1 (2006), pp. 97-115.

Mell et al., "The NIST Definition of Cloud Computing", Recommendations of the National Institute of Standards and Technology, NIST Special Publication 800-145, Sep. 2011, 7 pages.

Lin et al., "Optimizing User Expectations for Video Semantic Filtering and Abstraction," IEEE International Symposium on Circuits and Systems (ISCAS 2005), IEEE, 2005, pp. 1250-1253.

Cattuto et al., "Semantic Grounding of Tag Relatedness in Social Bookmarking Systems", ISWC 2008, LNCS 5318, pp. 615-631, 2008.

Wang et al., "Joint Social and Content Recommendation for User-Generated Videos in Online Social Network", IEEE Transactions on Multimedia, vol. 15, No. 3, Apr. 2013, pp. 698-709.

Dickersen et al., "Music Recommendation and Query-by-Content Using Self-Organizing Maps", Proceedings of International Joint Conference on Neural Networks, Jun. 14-19, 2009, pp. 705-710.

IBM: List of IBM Patents or Patent Applications Treated as Related (Appendix P), Oct. 3, 2017, pp. 1-2.

Catalano et al., Pending U.S. Appl. No. 15/719,888, filed Sep. 29, 2017, entitled "Cognitive Digital Video Recorder", pp. 1-50.

Catalano et al., Pending U.S. Appl. No. 15/719,869, filed Sep. 29, 2017, entitled "Cognitive Digital Video Filtering Based on User Preferences", pp. 1-36.

* cited by examiner

VIDEO CONTENT RELATIONSHIP MAPPING

BACKGROUND

The present disclosure relates to enhanced digital video content mapping using a data descriptor, such as a content tag. More specifically, the present disclosure relates to enhanced digital video content mapping using a cognitive analysis to tag content based on data extracted from the digital video content.

Devices and services can be used for a user to view digital video content. Such devices and services can include video recorders, digital downloads, streaming devices, or peer to peer file sharing to select digital video content. Because of the ease of access to digital video content, viewers are often presented with a plethora of digital video content to view, for example, as provided by a provider of movies, television shows (e.g., cable television), or other content service providers with various formats and services providing audio and visual content. As viewing digital video content is prolific, users can spend a significant amount of time programming and selecting content to view, and users can use many techniques for flagging or selecting digital video content.

In one scenario, a user can choose and view digital video content using a digital video content viewer. The content viewer may use an algorithm to gather additional digital video content for the viewer to watch. The content viewer may also arbitrarily present additional digital video content to the user. However, it can be difficult to determine the relevance of suggested digital video content based on a suggestion method that does not account for a user's viewing preferences. In either case, the additional digital video content suggestions may be made without regard for the user's viewing preferences. In one example, the user may not know until minutes into watching an instance of suggested digital video content whether it is based on the user's viewing preferences. For a user, the process of finding additional relevant digital video content to watch can be a process of trial and error, which is a cumbersome technique to select content to view.

This can result in viewers spending a significant amount of time watching irrelevant digital video content and also spending a significant amount of time viewing unwanted content.

SUMMARY

The present disclosure recognizes the inefficiencies of present digital content viewing and selection, thus, what is needed is a process and system for identifying digital content, which can be used for determining relevant digital video content for a viewer or user. The present invention can identify and determine similar digital video content, and indicate the strength of similarities between instances of digital video content.

The present invention provides a method for digital video content mapping including receiving and parsing a plurality of instances of digital video content using a computer. The digital video content includes audio and/or visual data available over a content delivery system communicating with the computer. The method defines content tokens for tagging content in the digital video content. The defining of the content tokens is based on a cognitive analysis of the digital video content. Related content tokens are identified in the plurality of digital video content using the cognitive analysis, and the identified related content tokens are tagged. A relationship map between the tagged related content tokens is created using the cognitive analysis. The relationship map indicates a strength of a relationship between the tagged content tokens and thereby the plurality of instances of digital video content.

In another embodiment according to the present invention, a system for digital video content mapping is presented. The system comprises a computer system comprising: a computer processor, a computer-readable storage medium, and program instructions stored on the computer-readable storage medium being executable by the processor, to cause the computer system to perform a method, the method including receiving and parsing a plurality of instances of digital video content using a computer. The digital video content includes audio and/or visual data available over a content delivery system communicating with the computer. The system defines content tokens for tagging content in the digital video content. The defining of the content tokens is based on a cognitive analysis of the digital video content. Related content tokens are identified in the plurality of digital video content using the cognitive analysis, and the identified related content tokens are tagged. A relationship map between the tagged related content tokens is created using the cognitive analysis. The relationship map indicates a strength of a relationship between the tagged content tokens and thereby the plurality of instances of digital video content.

In another embodiment according to the present invention, a computer program product in a computer networked environment for digital video content mapping is presented. The computer program product comprises a computer readable storage medium having program instructions embodied therewith. The computer readable storage medium is not a transitory signal per se, and the program instructions are executable by a computer to cause the computer to perform a method, the method including receiving and parsing a plurality of instances of digital video content using a computer. The digital video content includes audio and/or visual data available over a content delivery system communicating with the computer. The computer program product defines content tokens for tagging content in the digital video content. The defining of the content tokens is based on a cognitive analysis of the digital video content. Related content tokens are identified in the plurality of digital video content using the cognitive analysis, and the identified related content tokens are tagged. A relationship map between the tagged related content tokens is created using the cognitive analysis. The relationship map indicates a strength of a relationship between the tagged content tokens and thereby the plurality of instances of digital video content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
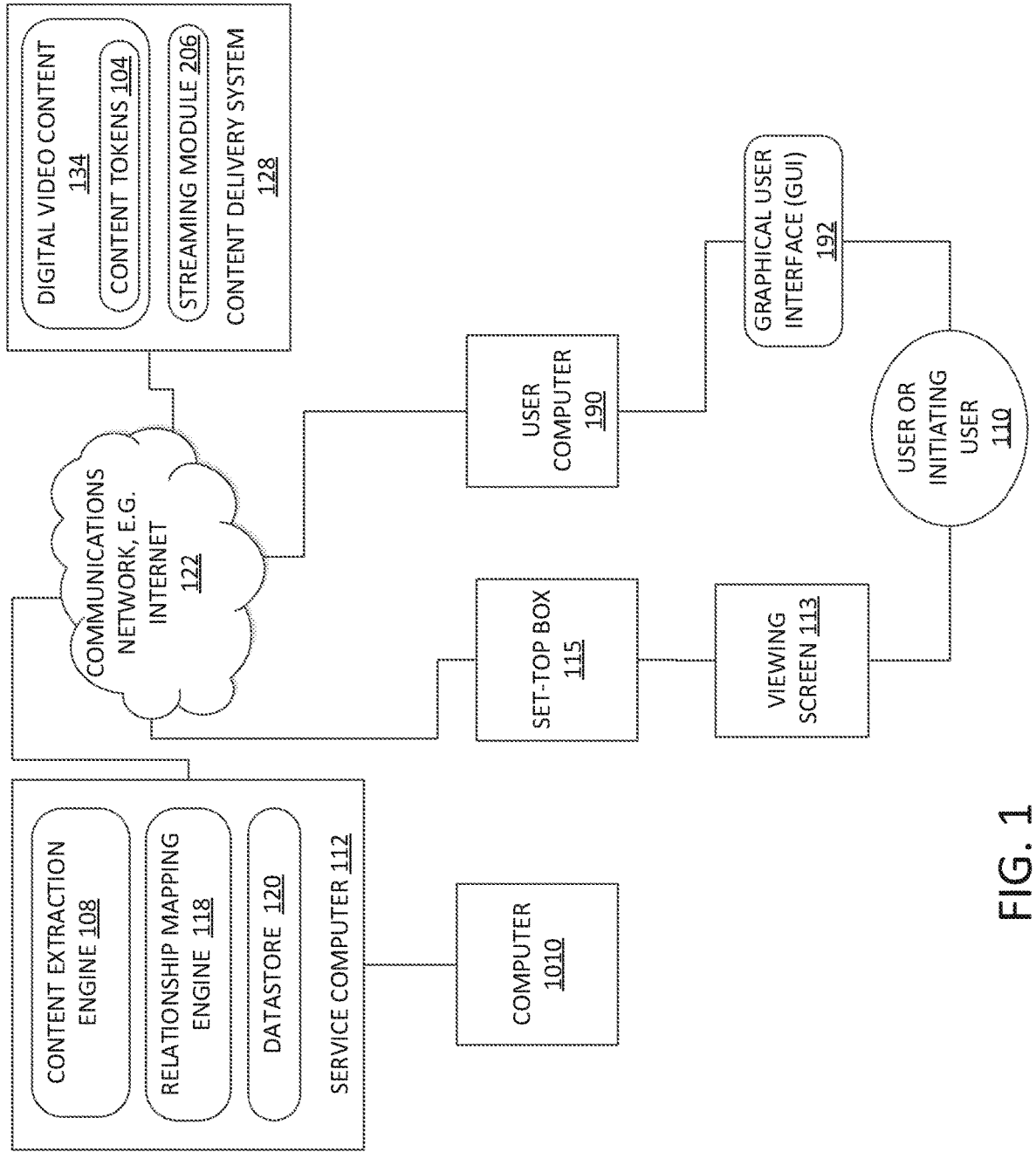
FIG. 1 is a schematic block diagram illustrating an overview of a system and methodology for using cognitive analysis to create a relationship map of digital video content for a viewer.
Figure 2:
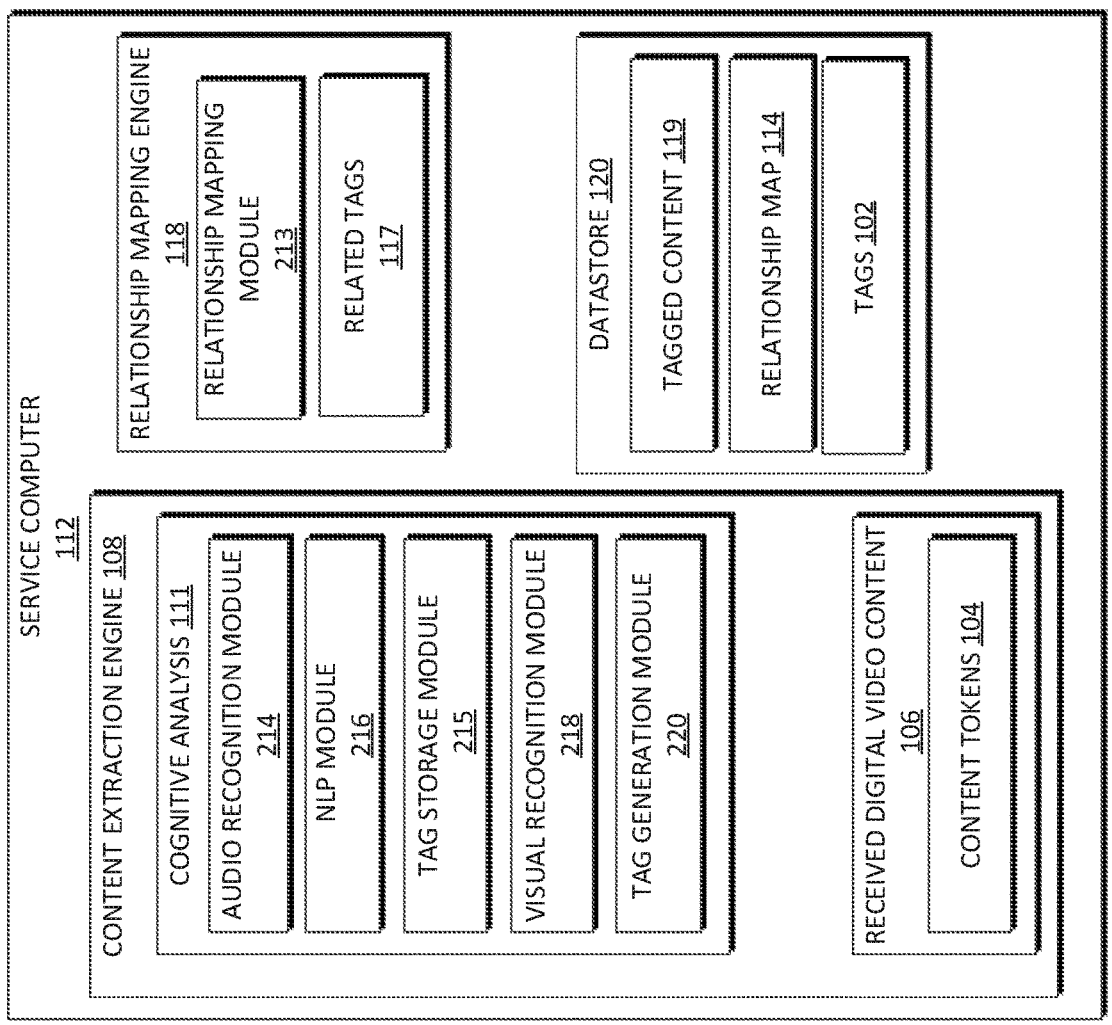
FIG. 2 is a schematic block diagram depicting a computer system according to an embodiment of the disclosure which includes a detailed depiction of a service computer (shown generally in FIG. 1) which cooperates with the system and methods shown in FIG. 1.
Figure 3:
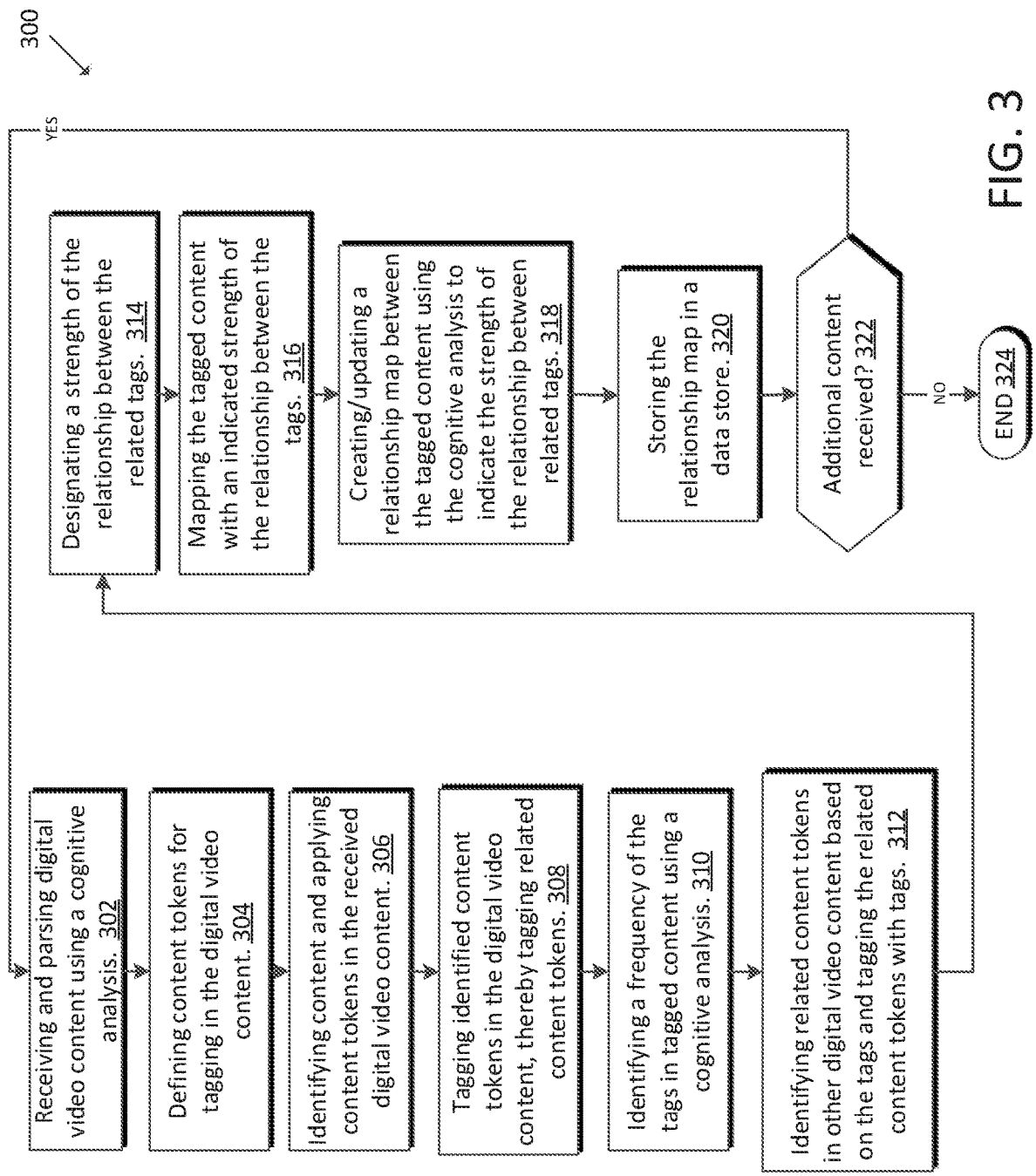
FIG. 3 is a flow chart depicting a method according to embodiments of the present invention.

Referring to FIGS. 1, 2, and 3, in one embodiment of the present disclosure, a system 15 and a method 300 are shown for video content relationship mapping. In one embodiment, a user(s) or an initiating user 110 can use an initiating computer, embodied as a user computer 190, to receive and view digital video content 134 delivered by a content delivery system 128. The user computer 190 can be any number of computing devices, for example, a mobile device, tablet, desktop or laptop computer connected to a graphical user interface (GUI) 192. The (GUI) 192 can be any user interface that allows users to interact with electronic devices (such as the user computer 190) through graphical icons. In another embodiment, the user 110 can view the digital video content 134 using an auditory and video receiving device embodied as a viewing screen 113, e.g, a television screen, connected to a set-top box 115. The set-top box 115 includes devices capable of converting digital television signals for viewing, for example, a cable box. The user 110 can use the viewing screen 113 to view instances of the digital video content 134 delivered by the content delivery system 128.

The content delivery system 128 can be used to deliver instances of digital video content 134 to devices across the communications network 122. The content delivery system 128 can contain a streaming module 206. The streaming module 206 can transmit instances of digital video content 134 over the Internet 122 to the service computer 112. The content delivery system 128 can communicate with the previously mentioned service computer 112 via the Internet 122. The Internet 122 connection can be managed by the service computer 112. The devices capable of receiving a number of instances of the digital video content 134 can include, for example, digital video recorders, mobile devices, and set-top cable boxes. The content delivery system 128 can include, for example, cable services, satellite systems, streaming services, and any current or future digital video content delivery device, service or system. The digital video content 134 can include audio and/or visual data being available over the content delivery system 128 communicating with the service computer 112.

A service computer 112 can interact with the content delivery system or service 128 using a communications network, e.g., the Internet 122, to receive and perform a cognitive analysis 111 on instances of digital video content 134 in order to extract content tokens 104 and build a relationship map 114 which may help determine the relevance of the instance to the user 110. The service computer 112, may be a server, for example, a back-end server or remote server at least from the perspective of the user.

In further embodiments according to the present disclosure, the components and function of the service computer 112 can be incorporated into the user computer 190. In another embodiment, the components and function of the service computer can be incorporated into a computer or a content service provider computer residing locally.

The service computer 112 includes a content extraction engine 108 for the extraction of data, for example, the data can include: audio data, visual data, and metadata from instances of received digital video content 106. Metadata is data that can provide additional information about other data. One type of metadata is descriptive metadata. Descriptive metadata can describe a resource for identification purposes. Descriptive metadata can include elements such as abstracts, authors, keywords, and titles. In embodiments of the present invention, descriptive metadata can describe the contents of digital video content 134, which can include specific actors, character personalities, genres, and themes. The content extraction engine 108 can generate content tokens 104 based on an extraction of the descriptive data from digital video content 134, as will be explained below.

The extracted data is used to generate content tokens 104 which may describe the audio and/or visual aspects of a particular instance of the received digital video content 106. The content tokens 104 may be defined based on a content definition criteria. The content definition criteria, and thereby the content tokens, is based on the data.

Such content can include a plurality of aspects of the content, such as, a particular person as part of the content, such as an actor, or a place or thing that appears in the content. Also, the content definition criteria can include a type of content such as a genre, theme, or subject. Further, the extracted data can include key information such as interpersonal relationships between characters, character affinities (likes/dislikes), plot depth of a show, and so on. This data would otherwise be unknown to a user 110 based upon a cursory review of a show description provided by a TV guide or information guide on a streaming service.

Such types of content and the content tokens can be sorted based on the frequency of occurrence. Thereby, the content definition criteria enables the identification of content specific to the user's viewing history and thereby the user. The content definition criteria can include one or more aspects of the content that enable comparison of a plurality of digital video content to ascertain similarity of the content including portions of the content for mapping the relationship (e.g., similarity or relevance) between the content of the plurality of the digital video content as is explained further in the present disclosure.

In one example, a cognitive analysis 111 can define the content using cognitive computing techniques. Cognitive computing is the simulation of human thought processes in a computerized model. Cognitive computing involves self-learning systems that use data mining (e.g., parsing content for relevant data), pattern recognition (e.g., detecting patterns in content based on specified criteria), and natural language processing (e.g., interpreting human language to find patterns) to mimic the way the human brain works. Embodiments of the present invention can self-learn, data mine, recognize patterns and employ natural language processing techniques to define content for identification (using the content definition criteria), and thereby generate the content tokens 104.

Additionally, content definition can be based on content descriptors, which can include the extracted metadata describing the received digital video content 106. The metadata may be placed in the received digital video content 106 by a content provider. The content extraction engine 108 extracts the metadata as well as audio and visual data and creates content tokens 104 from the instance of received digital video content 106 using the cognitive analysis 111 (FIG. 2).

The cognitive analysis 111 can include a number of application program interfaces (APIs) (shown in FIG. 2) in order to define the metadata, audio, and/or visual data in the received digital video content 106. The APIs can be computer code that allows two software programs to communicate with each other, for example, a visual recognition API and a speech transcription API can detect and label the audio and visual information contained in the digital video content 134 as will be described below. The cognitive analysis 111 can use an audio recognition module 214 and a visual recognition module 218 to analyze scenes in the received digital video content 106 for objects, faces, text and other content. The audio recognition module 214 (shown in FIG. 2) can transcribe audio information in the received digital video content 106 into the content tokens 104 as audio is identified by the cognitive analysis 111. The cognitive analysis 111 can use the visual recognition module 218 (shown in FIG. 2) to generate content tokens 104 describing the images in the received digital video content 106 by actors, objects, scenery and other key features based on the cognitive analysis 111.

The service computer 112 also includes a relationship mapping engine 118. The relationship mapping engine 118 can create a relationship map 114 between instances of digital video content 134. The relationship map 114 is created based on a determined strength of the relationship between the instances of digital video content 134. The strength of the relationship is used to predict the likelihood that the user 110 would prefer specific digital video content 134. The strength of the relationship in the relationship map 114 can be based on a low or high frequency of tagged content tokens in the digital video content.

The content extraction engine 108 and a relationship mapping engine 118, work in tandem to analyze digital video content 134 and build the relationship map 114 (shown in FIGS. 2 and 6) between the digital video content 134 as will be described in more detail below. In one example, the digital video content 134 is streamed to the service computer 112. The digital video content 134 is referred to as received digital video content 106 upon delivery to the service computer 112. The cognitive analysis 111 can parse the received digital video content 106 for content descriptors and label the content descriptors as content tokens 104 using a number of APIs. A visual recognition API, for example, a visual recognition module 218 (shown in FIG. 2) can recognize visual data in the (received digital video content 106) and an audio recognition module 214 (shown in FIG. 2) can recognize audio in the received digital video content 106 which is transformed into text. A natural language procession module 216 may analyze the transformed text to extract information such as character traits, interactions or relationships between characters, plot depth, etc. The audio and visual data may be defined as a number of content tokens 104 for tagging content. The cognitive analysis 111 can use a tag generation module 220 to create tags 102 for tagging the content tokens 104 and tag the content tokens 104 as they are identified in the digital video content.

The content tokens 104 indicate or describe portions of the digital video content 134. As will be described below in more detail, embodiments of the present invention can analyze data in instances of digital video content 134 in order to identify content for application of content tokens 104 in instances of digital video content 134. The content tokens 104 can capture the data in the digital video content 134 and label the themes or tones therein, in order to categorize the audio/visual data, for example, by actors, type, and theme. The content tokens 104 are used for tagging the received digital video content 106 where the content tokens 104 appear when digital video content matches the content definition criteria. The tagged content tokens are used to generate a relationship map 114 (shown in FIG. 2) depicting a strength of a relationship between instances of digital video content 134, as will be described below.

The content tokens 104 are identified by the cognitive analysis 111 (shown in FIG. 2) in order to determine the contents of the digital video content 134. A number of tags 102 are created by the cognitive analysis 111. The tags 102 are created for use as markers of where specific content tokens 104 appear in the received digital video content 106. Related content tokens 104 may be identified by the cognitive analysis 111 between instances of digital video content 134 (which can be considered related tags 117). After the tags 102 are identified in the digital video content 134, the digital video content 134 is referred to as tagged content 119 (shown in FIG. 2). Once the tags 102 are created for the digital video content 134, related tags 117 between instances of tagged content 119 can be used to build a relationship map 114 using the cognitive analysis 111. The relationship map 114 may indicate a strength of a relationship between the tags 102 with respect to instances of digital video content 134 as will be further explained in the embodiments of the invention.

It is understood that the service computer 112, the user computer 190, and the computer system 1010 are representative or illustrative of many alternative computer devices and are presented here as generic representations for the purposes of the embodiment(s) of the present invention. In the embodiment discussed below, for illustrative purposes, the method of the present disclosure can be embodied in the program 1060 (FIG. 7) or a software initiated from a client computer such as the computer system 1010. The computer system 1010 is discussed in more detail with reference to FIG. 7.

FIG. 2 depicts a detailed view of the service computer 112 depicted in FIG. 1. The service computer may include a content extraction engine 108, a relationship mapping engine 118 and a datastore 120.

The content extraction engine 108 can contain APIs capable of performing functions such as audio recognition (using an audio recognition module 214), natural language processing (using a natural language processing (NLP) module 216), and visual recognition (using a visual recognition module 218). The content extraction engine 108 may also contain a tag generation module 220. The tag generation module 220 can automatically define tags 102 for instances of digital video content 134 using the service computer 112 APIs communicating with the content delivery system 128 (shown in FIG. 1). The tag storage module 215 can store the tags 102 for use by the relationship mapping module 213.

The relationship mapping engine 118 can contain a relationship mapping module 213 and related tags 117. The relationship mapping engine 118 can use the relationship mapping module 213 to generate a relationship map 114 between one or more instances of tagged digital video content 134. The relationship mapping module 213 can store the relationship map 114 in the data store 120 on the service computer 112. The relationship mapping engine may compare tags 102 between instances of digital video content 134 to determine related tags 117 which are used to determine the strength of relationship between the instances of digital video content 134 in the relationship map 114. The tag storage module 215 can store the related tags 117 for use by the relationship mapping module 213. Related tags 117 may alternatively be discarded once the digital video content has been added to the relationship map 114 to minimize storage space.

The data store 120 can include the tags 102, the related tags 117, the relationship map 114, and tagged content 119. As discussed above, the tags 102 tag content tokens (also referred to as tagged content tokens) marking data. The related tags 117 are tags that are related to other tags (and thereby related to other content tokens) in other instances of received digital video content 106. The tagged content 119 represents instances of the received digital video content 106 that have been tagged using the tags 102. Tagged content 119 may alternatively be discarded once the digital video content has been added to the relationship map 114 to minimize storage space wherein the user 110 would extract data from the service computer 112, then receive the desired content from the content delivery system 128.

FIG. 3 depicts a method 300 which can perform the tagging of content tokens 104 based on the recognition of content according to an embodiment of the present invention. The elements depicted in FIGS. 1 and 2 can be used to perform the method 300. At block 302, the method includes receiving and parsing an instance of digital video content 134 using a computer, which in this example can be a service computer 112. The service computer 112 can receive the digital video content 134 and input it into the content extraction engine 108. The digital video content 134 is streamed over the communications network, e.g., the Internet 122, using the content delivery system 128. Upon receipt by the service computer 112, the digital video content 134 is referred to as a received digital video content 106. The received digital video content 106 is parsed by the content extraction engine 108 performing a cognitive analysis 111 of the received digital video content 106 using a number of APIs. For example, the method can use the cognitive analysis 111 to perform functions such as visual recognition for video and speech to text translation for audio in order to interpret the contents of the received digital video content 106. The cognitive analysis 111 can use can use a number of APIs to perform the visual recognition and speech to text translation.

The method can define a number of content tokens 104 for tagging content in the digital video content at block 304. The content tokens 104 may be defined based on a content definition criteria, which is based on content descriptors included in the digital video content 134 by the content provider. The content descriptors, can include metadata describing the received digital video content 106. The metadata may be placed in the received digital video content 106 by a content provider as a number of the content tokens 104 when the digital video content 134 is placed on the content delivery system 128. The method can define the audio and/or visual data in the received digital video content 106 after the parsing is performed by the content extraction engine 108 at block 302. For example, the method can use the audio recognition module 214 and the visual recognition module 218 to analyze scenes in the received digital video content 106 for objects, faces, text and other content. The audio recognition module 214 can transcribe audio information in the received digital video content 106 into content tokens 104 as speech is heard. The visual recognition module 218 can generate content tokens 104 describing the images in the received digital video content 106 by actors, objects, scenery and other key features based on the cognitive analysis 111.

At block 306 a number of content tokens 104 can be identified in the received digital video content 106. A content extraction engine 108 (FIG. 4) can be used to identify content and thereby apply content tokens by extracting the data included in the digital video content 134 and using the information to create content tokens 104 from the received digital video content 106. The output of the cognitive analysis 111 can be a number of corresponding content tokens 104 describing the audio and/or visual elements of the received digital video content 106.

Figure 4:
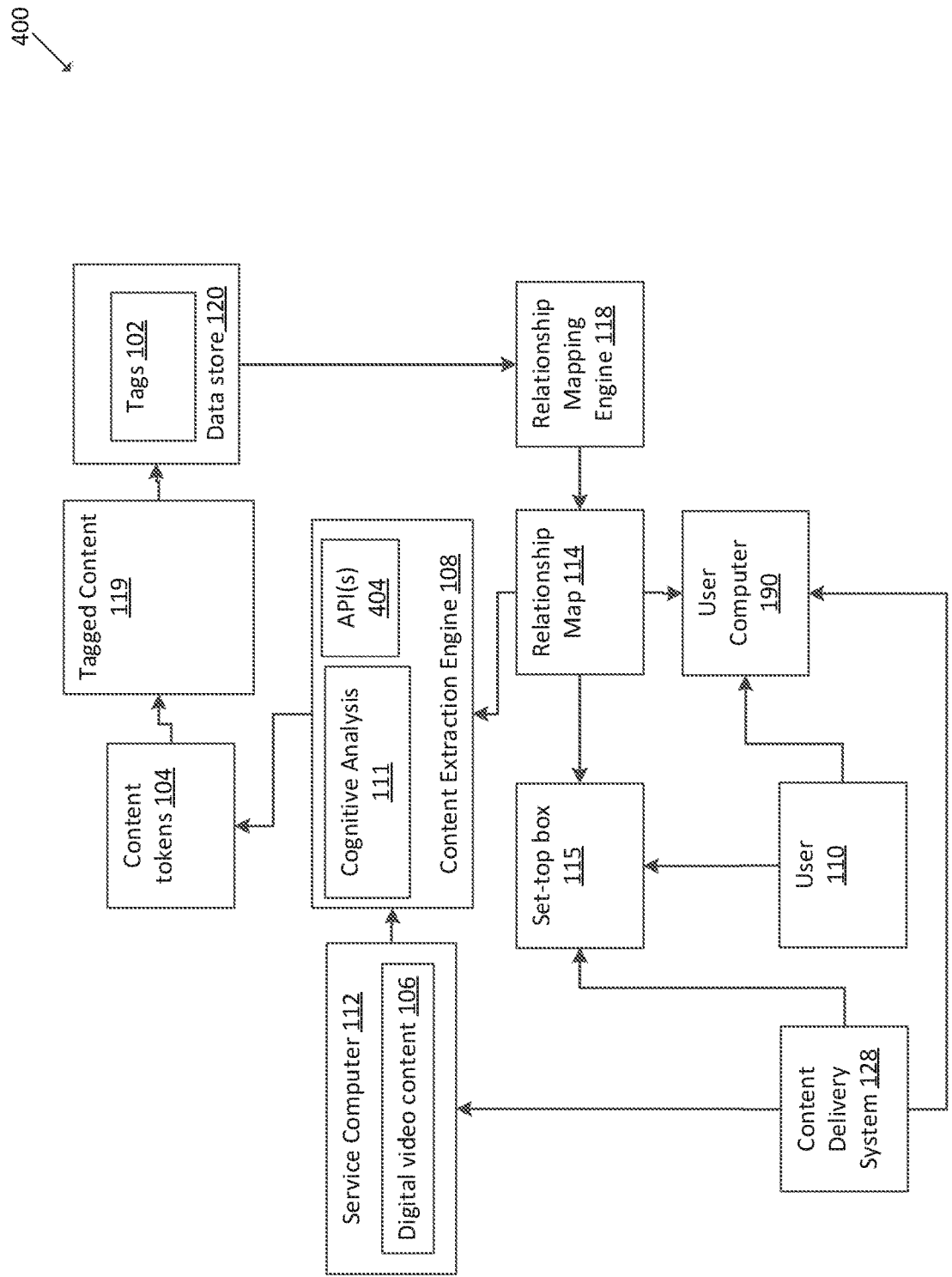
FIG. 4 is a schematic block diagram depicting a content extraction engine and the tagging of content tokens according to an embodiment of the present invention.

At block 308, the identified content tokens 104 are tagged as in they occur in the instance of received digital video content 106, creating tags 102 (FIGS. 2 and 4). The content extraction engine 108 can use the tag generation module 220 to tag where the content tokens 104, defined at block 304, occur in the received digital video content 106. The tagged content tokens are represented as tags 102. The tags 102 can include descriptive information, or a time stamp, such as a length and a duration of occurrence of the content tokens 104 in the received digital video content 106. The tagging process will be explained in greater detail with the explanation of FIG. 4 below.

At block 310, the method identifies a frequency of tags 102 occurring in the received instances of digital video content 106. The frequency of the tags 102 can be determined by several methods, for example, by tallying the number of occurrences of the tags 102.

At block 312, the method can identify related content tokens 104 in other instances of digital video content 134 based on the tags 102 of the first instance of received digital video content 106. The method can compare tags 102 from a second received digital video content 106 for matching the tags 102 from the first received digital video content 106 that were created at block 308. The method can tag the related content tokens with tags (for example, the tagged related content tokens can be referred to as related tags 117). The tagging is accomplished using the tag generation module 220.

The method includes designating a strength of the relationship between related tagged content as identified in instances of the digital video content 134, at block 314. The method can designate a high strength of the relationship between the instances in response to a high frequency of related tags 117. The method can also designate a low strength of the relationship between the identified instances in response to a low frequency of related tags 117.

The method can use the relationship mapping engine 118 (shown in FIG. 1) to map instances of the digital video content 134 with the identified high or low strength of the relationship at block 316. When instances of the digital video content 134 are mapped together, the mapping indicates that the instances likely contain similar content. The relationship mapping process is described in detail below in FIGS. 5 and 6. The strength of the relationship between instances of digital video content may be rated on a number of categories (e.g., two instances of digital video content may have a high strength of relationship in that they are both related to law enforcement, but they may also have a low strength of relationship in that one is a drama with a deep plot and the other is a comedy.

The method 300 includes creating and updating the relationship map 114 using the strength of relationship between instances of digital video content at block 318. The relationship mapping engine 118 (shown in FIG. 2) creates the relationship map 114 (shown in FIG. 1) to reflect a determination of a strength of a relationship using the tags 102 and the related tags 117. The relationship mapping engine 118 can use the tag storage module 215 (FIG. 2) to store the tags 102, and the relationship map 114. The relationship mapping module 213 can associate instances of digital video content 134 with each other based on the strength of the relationship between the tags 102 contained in the instances of digital video content 134. The relationship map 114 can be built between shows, seasons, series, etc. based on the number of related tags 117 (that is, tags that are tagging similar content tokens) tagging instances of received digital video content 106. At block 320, the method can store the created relationship map 114 on a datastore 120 residing on the service computer 112.

At block 322, the method can determine whether the content provider has added new instances of digital video content 134. If the method determines that the content provider has added new instances of digital video content 134, the method returns to block 302 and performs the method steps again including the cognitive analysis 111. The updating of the relationship map at block 318 can be performed by tags 102 being applied as a result of a cognitive analysis 111 of the received digital video content 106. The relationship mapping process is further described below with reference to FIGS. 5 and 6. When the method 300 detects that no additional instances of digital video content 134 have been added, the method can end at block 324.

Referring to FIG. 4, an embodiment of the method 400, depicts a content extraction engine 108 and the generation of tags 102. In this example, a content provider adds an instance of digital video content 134 to a content delivery system 128 using a computer. The digital video content is delivered to the user 110 using a content delivery system 128. The content delivered to the service computer 112 (by the content delivery system 128), user computer 190, and/or set-top box 115 as digital video content 134 and the received digital video content is depicted as digital video content 106. It may contain audio and/or visual elements. The content extraction engine 108 can parse the received digital video content 106 in order to define content tokens 104 within the received digital video content 106. The content tokens 104 can be audio and/or visual information describing the instance of digital video content 134. The received digital video content 106 is input into the content extraction engine 108.

The content extraction engine 108 can use a number of APIs (depicted as APIs 404) such as a visual recognition module 218 to detect visual information in the digital video content and label it as a content token 104. An audio recognition module 214 can detect audio information and label it as a content token 104 as well. These recognized audio/visual/textual content tokens 104 are part of a cognitive analysis 111 that includes interpretation by NLP module 216 (shown in FIG. 2) which may additionally analyze closed captioning data if available. The method may use the content tokens 104 for tagging (marking) the occurrence audio/visual/textual data in the digital video content. Tagged content 119 is representative of the received digital video content 106 that has been tagged. In this example, the tags 102 are placed in a data store 120 using a tag storage module 215 (shown in FIG. 2) accessible by a relationship mapping engine 118 to build relationship map 114. The content delivery system 128 can deliver related content to a set-top box 115 or a user computer 190 based on information from relationship map 114.

Thereby, in the method of the present disclosure, the content definition criteria (and thereby the content tokens) enables the identification of content specific to the user and the user's viewing history. This is in contrast to recommending content or works to a user based on genres (such as comedy, or drama), or other viewer's preferences who have viewed the same content as the user. In the present disclosure, the content definition criteria and thereby the content tokens, are used to tag content that appear in the body of work itself, thus recommendations to the user are specific to the content itself of the body of work.

Figure 5:
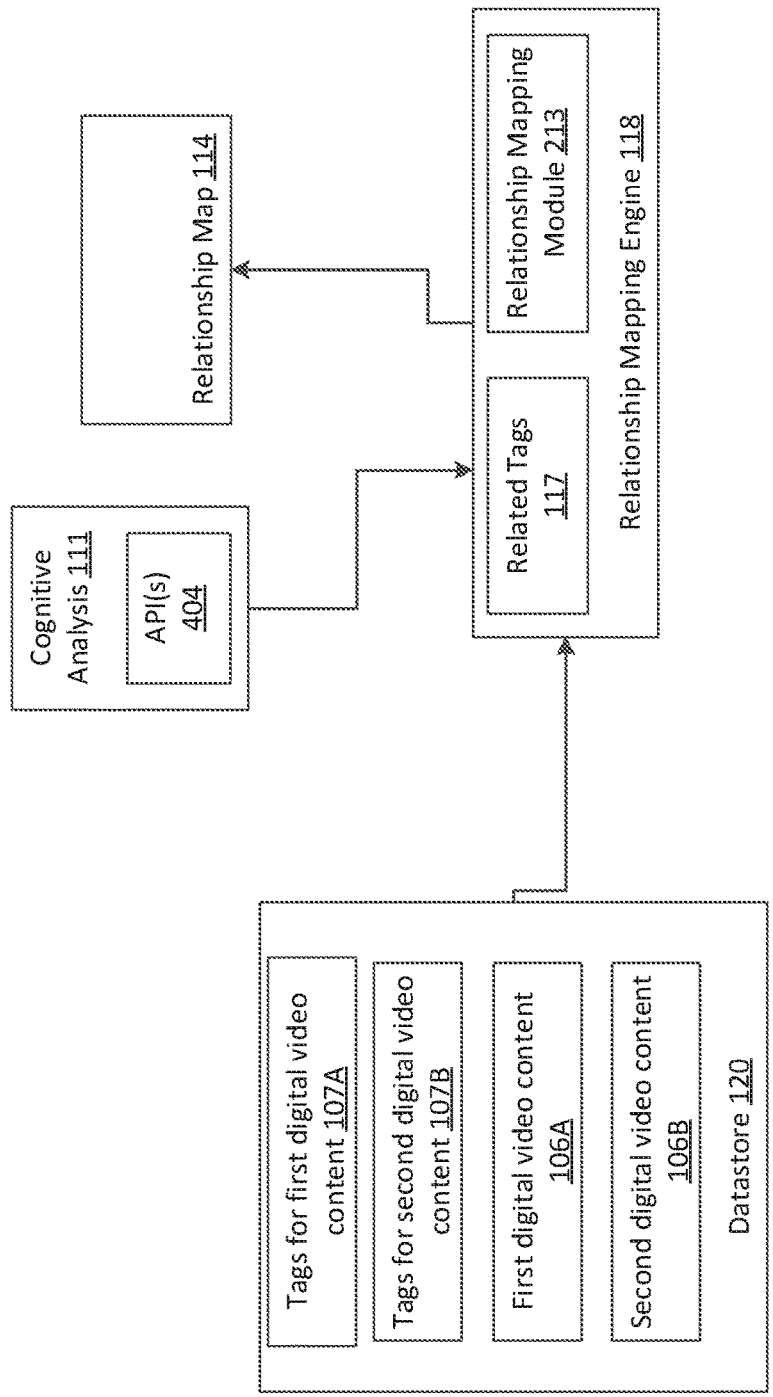
FIG. 5 is a schematic block diagram depicting a relationship mapping engine and the creation of a relationship map according to an embodiment of the present invention.

Referring to FIG. 5, an embodiment of the method 500, depicts a relationship mapping engine 118. The relationship mapping engine 118 can use a number of APIs (represented as API(s) 404) from cognitive analysis 111 for cognitive matching of tags 102 to generate related tags 117. In this example, tags 107A for a first digital video content 106A, and tags 107B for a second digital video content 106B are stored on a datastore 120 and used as inputs to the relationship mapping engine 118. The relationship mapping engine 118 accesses the data store 120 and can compare the tags for the first digital video content 107A with tags 102 of other instances of received digital video content 107B to generate related tags 117. The relationship mapping engine 118 can use a cognitive analysis 111 to determine a strength of the relationship between the instances. A relationship map 114 can be created between the first digital video content 106A and the second digital video content 106B based on the strength of the relationship between the instances of content. In one example, one factor that initiates a relationship map can include a match of high frequency tags 102, e.g. a high strength of a relationship between the instances of digital video content. The strength of the relationship can be based on tag occurrence (expressed as a numerical tally), or a number of matching tags, or an NLP analysis that shows commonalities between characters, plot lines, etc. In either case, the strength of the relationship is used to evaluate specific instances of digital video with respect to each other. The relationship mapping engine 118 repeats this process for each content instance of digital video content. The relationship map 114 is continually updated as additional instances digital video content 134 complete the content extraction process (FIG. 4). The relationship map 114 uses the strength of the relationship between instances of digital video content, for example, digital video content 106A and digital video content 106B (as shown in FIG. 5, and discussed in more detail below) to build a relationship map 114. The content delivery system 128 can deliver relevant digital video content to users 110 based on suggestions from the relationship map 114.

Figure 6:
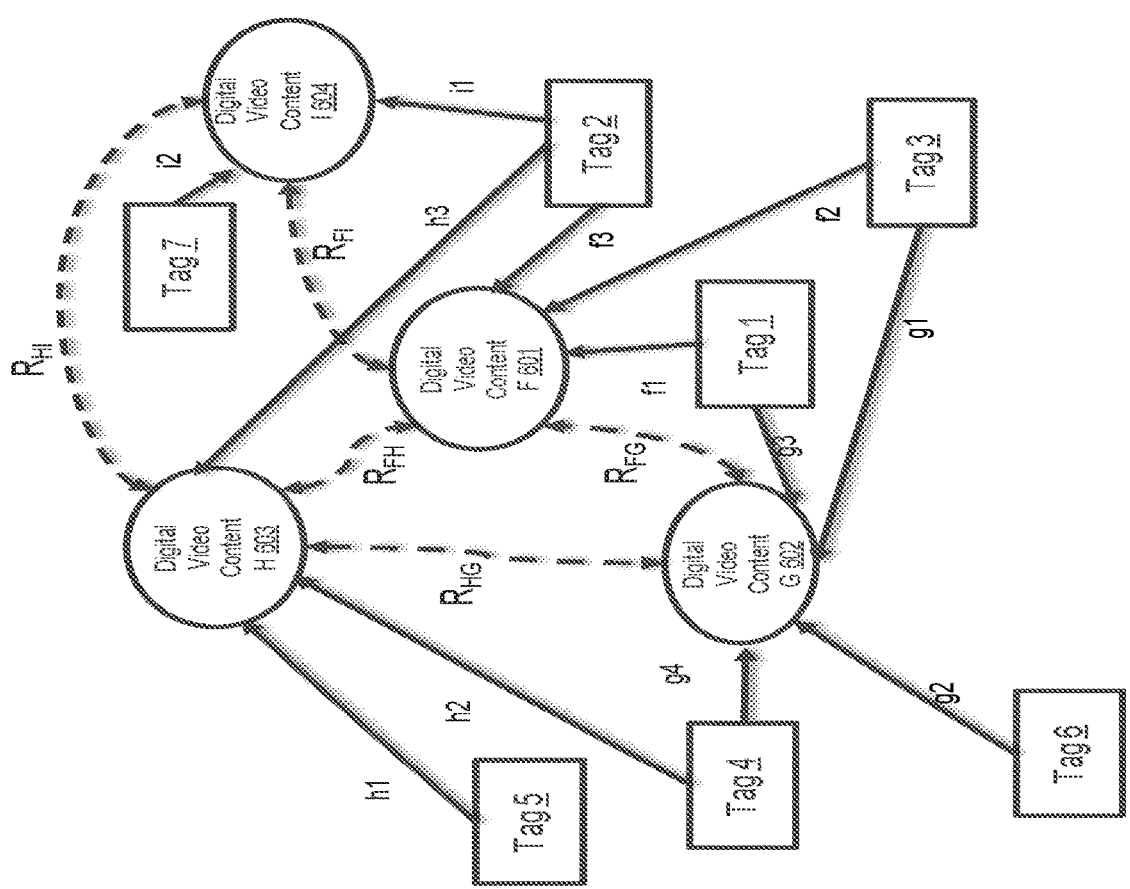
FIG. 6 is a diagram depicting the mapping of tags and the creation of a relationship map according to an embodiment of the present invention.

An embodiment of a relationship map 114, according to an embodiment of the present invention, is shown in FIG. 6. The relationship map 114 is a visual depiction of the strength of the relationship between instances of digital video content. A plurality of instances of the digital video content are identified based on a content provider adding new digital video content to a content delivery system 128. The plurality of identified instances are tagged where content tokens are marked in the digital video content. Here, boxes depicted as digital video content F 601, digital video content G 602, digital video content H 603, digital video content I 604, represent the instances of digital video content (also referred to as instances F, G, H, and I). Tags 1, 2, 3, 4, 5, 6, 7 depict tags which are created using the content extraction engine 108.

In the example shown in FIG. 6, RNM indicates a strength of the relationship between instances of digital video content. R can be representative of a number of frequency determination factors, for example, the sum of the frequency of the instances of the digital video content. "N" and "M" respectively are each an instance of digital video content. In this embodiment, the relationship between instances of digital video content can be determined by summing the product of the frequency of appearance of each tag within each instance of digital video content. In one example, the strength of the relationship between instance F 601 and instance G 602 can be computed using the equation $R_{FG}=f_1*g_3+f_2*g_1$. f1 is the frequency at which tag 1 appears in instance F 601. $g_3$ is the frequency at which tag 1 appears in instance G 602. f1 is multiplied by g3 to determine the number of occurrences of tag 1. For example, f1=5 occurrences, and g3=3 occurrences, resulting in 3×5=a weighting factor of 15. Tag 1 is generated as an indication of the occurrences of tag 1 appearing in instance F 601 and instance G 602. Instances F 601 and G 602 also both contain tag 3. The frequency of tag 3's occurrence in instance F 601 is depicted as $f_2$. Similarly, the frequency of the occurrence of tag 3 in instance G 602 is depicted as $g_1$. In this example, f2=2 and g1=5 for a weighting factor of 10 (2×5=10). Tag 3 is generated as an indication of the occurrences of tag 3 in instance F 601 and G 602. Summing the products of the frequencies of occurrences of the content tokens results in 10+15=25 for a total summed weighting factor of 25.

Summing these products, (which depict the frequency of each tag within each instance of digital video content), provides a mathematical depiction of the strength of the relationship between instances of digital video content. The relationship mapping engine 118 can use the aforementioned mathematical equations to create a relationship map 114 between instances of received digital video content 106. The relationship map can be updated based on the relationship strength of the tagged instances. The numerical tally of the number of occurrences of the tags in the identified content instances is correlated with a strength of the relationship between the identified content instances. The greater the frequency of the occurrence of common tags, the stronger the relationship between content instances of the digital video content. In one example, advertisers could use the determined strength between instances of the digital video content in order to make marketing decisions about a target audience. For example, the advertisers could determine that viewers prefer specific instances of digital video content and place advertisements in the instances in order to increase the likelihood that the advertisements will be viewed by the viewers.

In one example, an advantage of the present invention is that it provides a process for analyzing digital video content and forming a relationship map between media based on the content extracted from the digital video content. The digital video content is analyzed to determine when and where specific tags appear within the digital video content. Once created, the tags are sorted by frequency of occurrence. These tags can include tone, theme, personality of characters, etc. and can be used to relate instances of digital video content. The present invention builds a relationship map between digital video content based on the tagging of the content. Another advantage of the present disclosure is that it includes a method of tagging digital video content without requiring user input.

In one embodiment of the present invention, digital video content is parsed via a content extraction engine which includes an interface. An interface can include, for example, an application program interface (API). An API is a set of routines, protocols, and tools for building software applications. An API specifies how software components should interact with each other to achieve a desired result or output. According to embodiments of the present invention, APIs are programmed to interpret digital video content and determine the strength of the relationship between instances of digital video content.

Watson™ Embodiment

One embodiment of the present disclosure can use IBM Watson® including Watson™ APIs (herein referred to as the Watson™ embodiment). In one example of the present disclosure, a content extraction engine can include but is not limited to Watson™ APIs. Watson™ APIs can be used to extract content tags from digital video content. The digital video content can be analyzed to determine when and where specific tags appear within the body of the digital video content.

The Watson™ embodiment of the present disclosure may use Watson™ APIs to achieve the desired result, i.e., a relationship map that determines the strength of relationship between instances of video content. Watson™ APIs enable cognitive computing features in computer applications.

Continuing with the Watson™ embodiment of the present disclosure, the embodiment can include a cognitive text analyzer, such as Watson™ AlchemyLanguage service. Watson™ AlchemyLanguage is a collection of text analysis functions that derive semantic information from inputted digital video content. Extracted text which could be hypertext markup language (HTML), or a public universal resource locator (URL) may leverage sophisticated natural language processing techniques to get a quick high-level understanding of the inputted digital video content and obtain detailed insights such as directional sentiment from entity to object. Natural language processing is a field of computational linguistics concerning the use of human language, specifically programming computers to process natural language text and understand human speech as it is spoken. In one embodiment of the present invention, a content extraction engine can use the Watson™ Alchemy-Language API to generate tags from digital video content.

The Watson™ embodiment of the present disclosure can include a visual recognition API, such as Watson™ Visual Recognition API. Watson™ Visual Recognition API uses deep learning algorithms to analyze images for scenes, objects, faces and other content. The response includes keywords that provide information about the content. A set of built-in classes provides highly accurate results without a user training the API. In one embodiment of the present invention, a content extraction engine can use the Watson™ Visual Recognition API to generate tags from digital video content.

The Watson™ embodiment of the present disclosure can include a speech transcription service, such as Watson™ Speech to Text API. A speech transcription service converts an audio file into a textual record using software that recognizes auditory messages and associates them with related text. The Watson™ Speech to Text service provides an API that adds speech transcription capabilities to the invention. The service transcribes the human voice using machine intelligence to combine information about grammar and language structure with knowledge of the composition of the audio signal. The service continuously returns and retroactively updates the transcription as more speech is heard. The resulting output can be used to generate tags from digital video content.

The Watson™ embodiment of the present disclosure can include a human speech tone analyzer, such as Watson™ Tone Analyzer. In conjunction with the Watson™ Speech to Text Transcription Service, the Watson™ Tone Analyzer provides a linguistic analysis of the communication tones in written text. The service allows the user to understand conversations and communications and respond appropriately. In this embodiment of the present invention, the Watson™ Tone Analyzer and Watson™ Speech to Text Transcription services can work in tandem to transcribe speech to text and provide auditory and written cues to generate tags from digital video content.

The Watson™ embodiment of the present disclosure can include a natural language classifier, such as the Watson Natural Language Classifier (NLC) service. The Watson™ Natural Language Classifier understands the intent behind text and returns a corresponding classification, complete with a confidence score. For example "what is the weather like today?" is a way of asking about temperature. The Natural Language Classifier can perform functions including categorizing volumes of written content. In this embodiment of the present invention, the NLC can categorize the transcribed text of audio extracted from received digital video content.

The present disclosure also provides an advantage to advertisers. Advertisers can use a relationship map to determine similar video content and target said content to increase the likelihood that targeted users will watch their advertisement. If the users desire to watch the content containing advertisements, there is a greater likelihood that the advertisement itself will be viewed.

Figure 7:
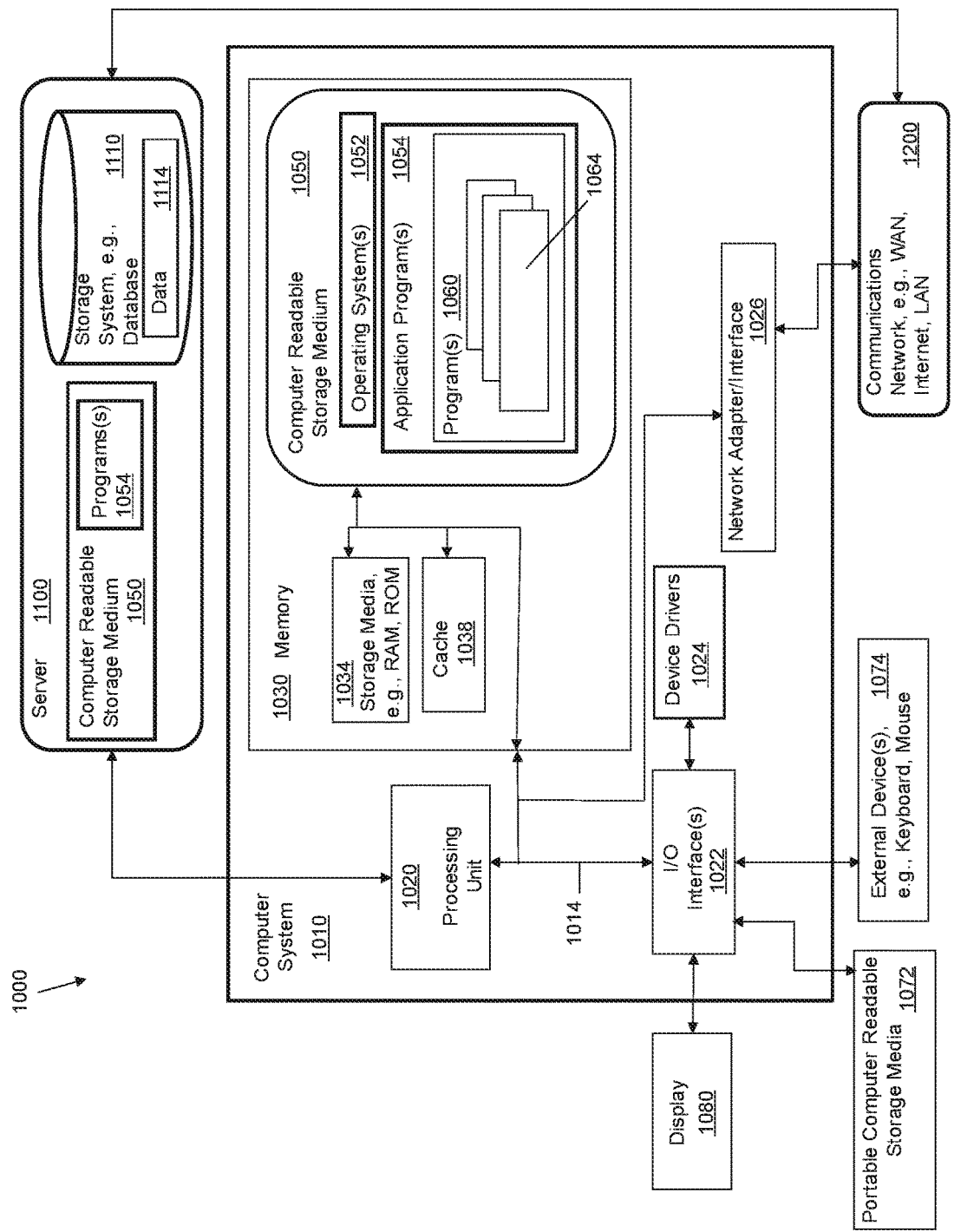
FIG. 7 is a schematic block diagram depicting a computer system according to an embodiment of the disclosure which includes a detailed depiction of a computer (shown generally in FIG. 1) and which cooperates with the system and methods shown in FIGS. 1, 2, 3, 4, and 5.

Referring to FIG. 7, a system 1000 includes a computer system or computer 1010 shown in the form of a generic computing device. The method 300, for example, may be embodied in a program(s) 1060 (FIG. 7) embodied on a computer readable storage device, for example, generally referred to as memory 1030 and more specifically, computer readable storage medium 1050 as shown in FIG. 7. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g. interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 7 as program modules 1064. The program 1060 and program modules 1064 can execute specific steps, routines, sub-routines, instructions or code, of the program.

The method of the present disclosure can be run locally on a device such as a mobile device, or can be run as a service, for instance, on the server 1100 which may be remote and can be accessed using the communications network 1200. The program or executable instructions may also be offered by a service provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 7, the system 1000 includes the computer system shown in the form of a general purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and or/cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and a an optical disk drive for reading from or writing to a removable, non-volatile optical disk such as a CD-ROM, DVD-ROM, or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 300 FIG. 3, for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with computer 1010; and/or any devices (e.g., network card, modem, etc.) that enables the computer 1010 to communicate with one or more computing devices. Such communication can occur via the Input/Output (I/O) interfaces 1022. Still yet, the computer 1010 can communicate with one or more networks 1200 such as local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later depicted.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g. mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g. cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
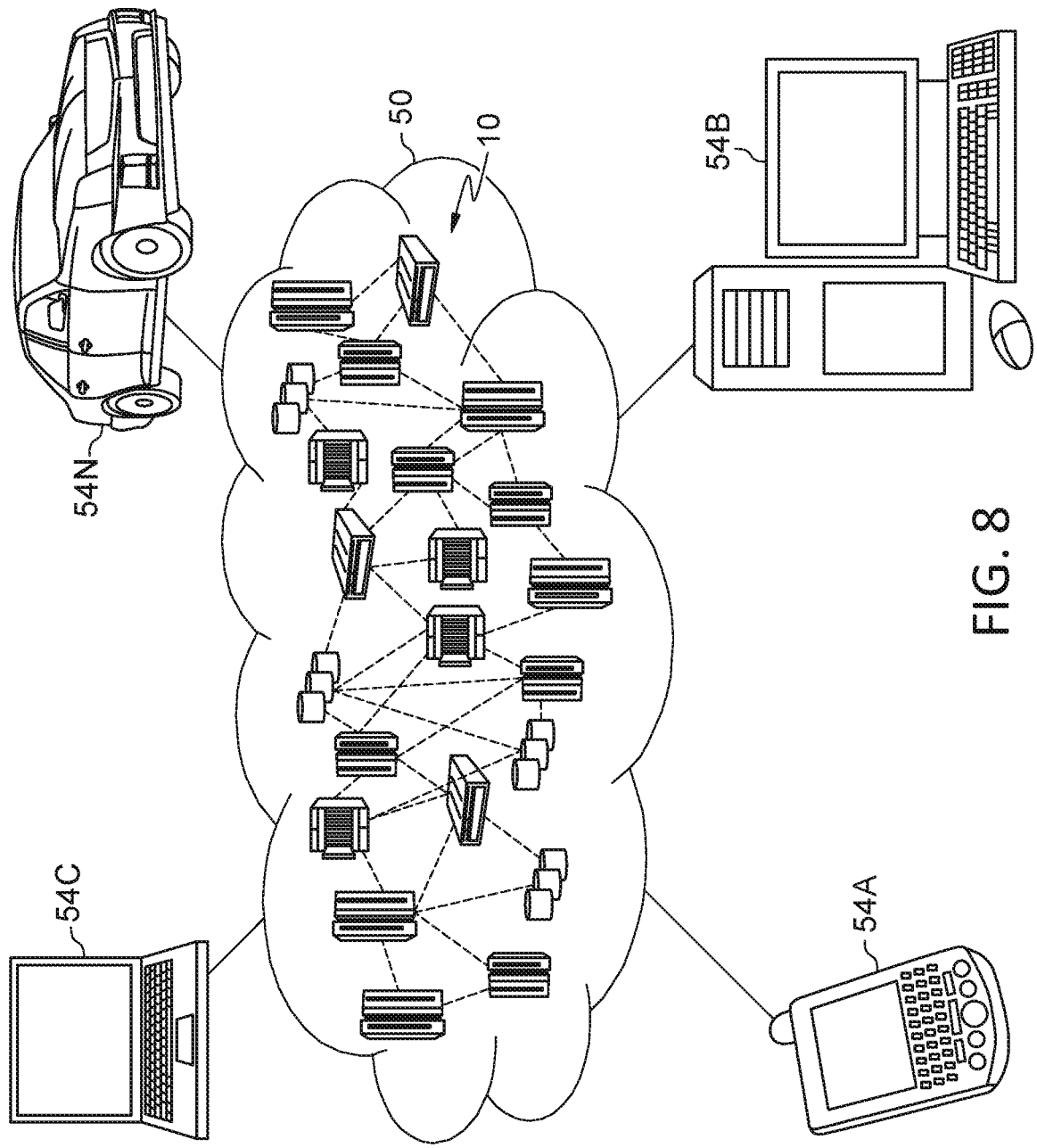
FIG. 8 depicts a cloud computing environment according to an embodiment of the present invention.

Referring now to FIG. 8, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid cloud as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
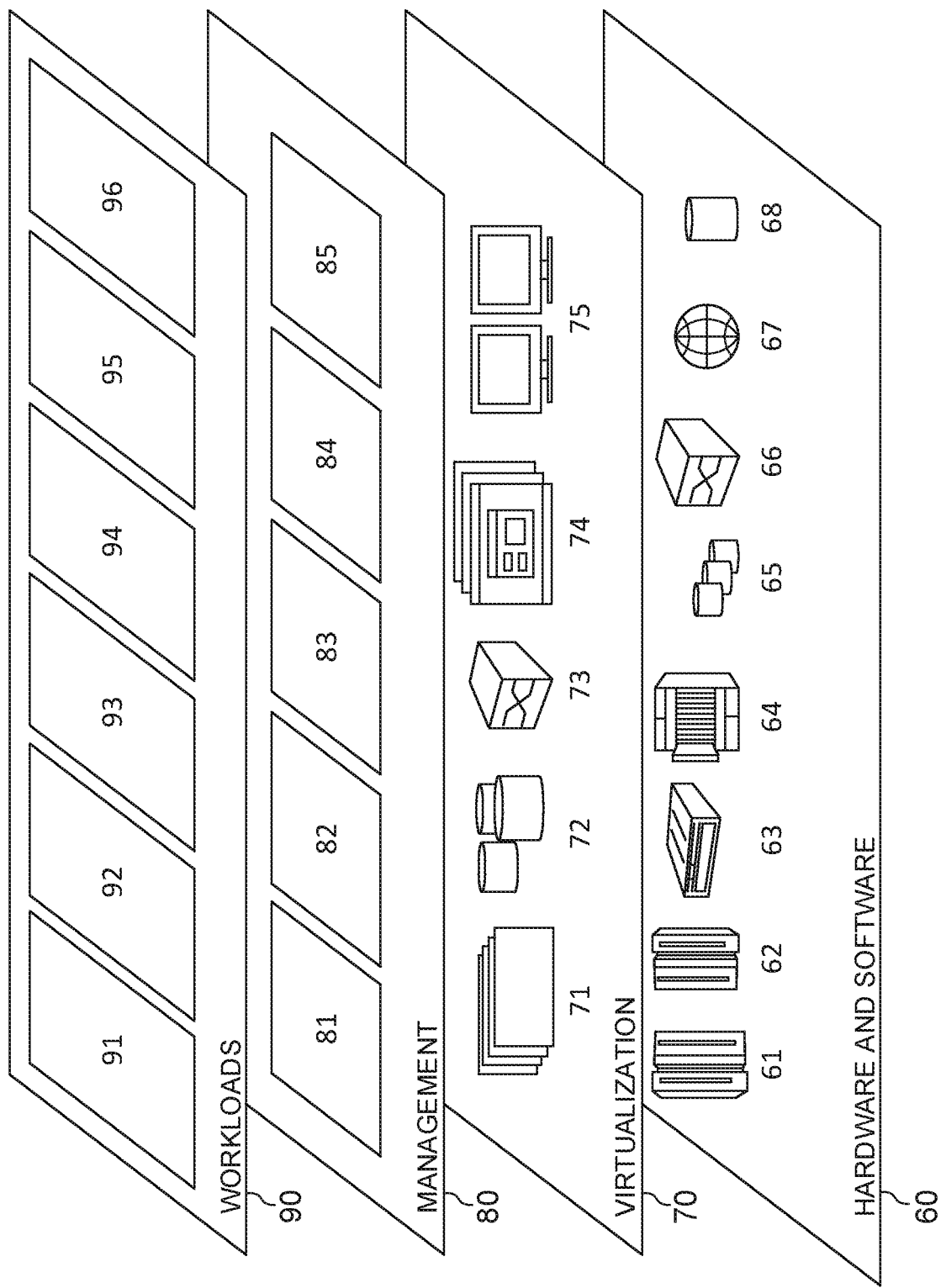
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73; including virtual private networks; virtual applications and operating systems 74; and virtual clients 75.

In one example management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and 96 digital video content relationship mapping.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only (CD-ROM), a digital versatile disk (DVD), a memory stick, a floppy disk, a mechanically encoded device such as punch-cards or raised structures in a groove having instructions recorded thereon, and any suitable combination foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and party on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devise to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the function/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the function noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for digital video content mapping, the system comprising:
a computer system comprising: a computer processor, a computer-readable storage medium, and program instructions stored on the computer-readable storage medium being executable by the processor, to cause the computer system to perform a method, comprising:
creating content tokens from a plurality of instances of digital video content, the creating of the content tokens being based on a cognitive analysis of the plurality of instances of digital video content, each content token describing an audio, visual, or both an audio and visual aspect of a particular instance of digital video content, each instance of digital video content being provided to a content delivery system by a content provider;
determining a strength of relationship between the plurality of instances of digital video content by:
identifying a frequency of the content token in each instance of digital video content, the frequency being a numerical tally of a number of occurrences of the content tokens in each instance of digital video content; and
calculating a product of the frequency of the content token in a first instance of the plurality of instances of digital video content and the frequency of the content token in a second instance of the plurality of instances of digital video content, wherein the content token is common to the first instance and the second instance;
and creating a relationship map of the plurality of instances of digital video content indicating the determined strength of relationship between the plurality of instances of digital video content.

2. The system of claim 1, further comprising performing a cognitive analysis of the content tokens using a content extraction engine being part of a software application stored on a computer readable storage medium of the computer, the content extraction engine including application program interfaces (APIs) for parsing of digital video content.

3. The system of claim 1, further comprising recording a time stamp or a duration of occurrence for each of the content tokens, the time stamp or the duration of occurrence indicating a time or a duration of a content token within a respective instance of digital video content.

4. The system of claim 1, further comprising updating the relationship map based on the identified frequency of the content tokens.

5. The system of claim 1, further comprising:
designating a high strength of relationship between instances of digital video content in response to a high frequency of content tokens; and
designating a low strength of relationship between instances of digital video content in response to a low frequency of content tokens.

6. The system of claim 5, wherein the relationship map includes a mapping of the plurality of instances of digital video content with the designated high strength of relationship between the instances of digital video content, and the designated low strength of relationship between the instances of digital video content.

7. The system of claim 1, wherein the cognitive analysis includes an extraction of data from the plurality of instances of digital video content, the data being selected from the group consisting of: audio data, visual data, and metadata.

8. A computer program product for digital video content mapping, the computer program product comprising a computer readable storage medium having program instructions embodied therewith, wherein the computer readable storage medium is not a transitory signal per se, the program instructions executable by a computer to cause the computer to perform a method, comprising:
creating content tokens from a plurality of instances of digital video content, the creating of the content tokens being based on a cognitive analysis of the plurality of instances of digital video content, each content token describing an audio, visual, or both an audio and visual aspect of a particular instance of digital video content, each instance of digital video content being provided to a content delivery system by a content provider;
determining a strength of relationship between the plurality of instances of digital video content by:
identifying a frequency of the content token in each instance of digital video content, the frequency being a numerical tally of a number of occurrences of the content tokens in each instance of digital video content; and
calculating a product of the frequency of the content token in a first instance of the plurality of instances of digital video content and the frequency of the content token in a second instance of the plurality of instances of digital video content, wherein the content token is common to the first instance and the second instance;
and creating a relationship map of the plurality of instances of digital video content indicating the determined strength of relationship between the plurality of instances of digital video content.

9. The computer program product of claim 8, further comprising performing a cognitive analysis of the content tokens using a content extraction engine being part of a software application stored on the computer readable storage medium, the content extraction engine including application program interfaces (APIs) for parsing of digital video content.

10. The computer program product of claim 8, further comprising recording a time stamp or a duration of occurrence for each of the content tokens, the time stamp or the duration of occurrence indicating a time or a duration of a content token within a respective instance of digital video content.

11. The computer program product of claim 8, further comprising updating the relationship map based on the identified frequency of the content tokens.

12. The computer program product of claim 8, further comprising:
   designating a high strength of relationship between instances of digital video content in response to a high frequency of content tokens; and
   designating a low strength of relationship between instances of digital video content in response to a low frequency of content tokens.

13. The computer program product of claim 12, wherein the relationship map includes a mapping of the plurality of instances of digital video content with the designated high strength of relationship between the instances of digital video content, and the designated low strength of relationship between the instances of digital video content.

* * * * *